Dec. 3, 1929.   O. J. SIMLER   1,738,401
INTERLOCKING AND TRIPPING SWITCH FOR AUTOMOBILE SIGNALS
Filed April 3, 1926   8 Sheets-Sheet 2

R. A. Thomas.
WITNESS:

O. J. Simler
INVENTOR
BY Victor J. Evans
ATTORNEY

Dec. 3, 1929.   O. J. SIMLER   1,738,401
INTERLOCKING AND TRIPPING SWITCH FOR AUTOMOBILE SIGNALS
Filed April 3, 1926   8 Sheets-Sheet 3

Dec. 3, 1929.  O. J. SIMLER  1,738,401
INTERLOCKING AND TRIPPING SWITCH FOR AUTOMOBILE SIGNALS
Filed April 3, 1926   8 Sheets-Sheet 4

O. J. Simler
INVENTOR
BY Victor J. Evans
ATTORNEY

WITNESS:

Dec. 3, 1929.  O. J. SIMLER  1,738,401
INTERLOCKING AND TRIPPING SWITCH FOR AUTOMOBILE SIGNALS
Filed April 3, 1926  8 Sheets-Sheet 5

Dec. 3, 1929.   O. J. SIMLER   1,738,401
INTERLOCKING AND TRIPPING SWITCH FOR AUTOMOBILE SIGNALS
Filed April 3, 1926   8 Sheets-Sheet 7

Dec. 3, 1929. O. J. SIMLER 1,738,401
INTERLOCKING AND TRIPPING SWITCH FOR AUTOMOBILE SIGNALS
Filed April 3, 1926 8 Sheets-Sheet 8

O. J. Simler INVENTOR

Patented Dec. 3, 1929

1,738,401

UNITED STATES PATENT OFFICE

OSCAR J. SIMLER, OF SEBRING, OHIO

INTERLOCKING AND TRIPPING SWITCH FOR AUTOMOBILE SIGNALS

Application filed April 3, 1926. Serial No. 99,647.

This invention relates to signal means for motor vehicles and the like, the general object of the invention being to provide means, some of which are automatic, for indicating when the vehicle is to slow up or stop or is to be turned to the right or left.

Another object of the invention is to provide means for operating the slow signal by the brake pedal and for operating the stop signal by the clutch pedal when the brake pedal is depressed, the signal means remaining inactive when the clutch means is depressed alone.

A further object of the invention is to provide manually operated means for actuating the right and left signals with means actuated by the steering mechanism, in turning the front wheels to their center position, for returning the signal means to neutral position.

A further object of the invention is to provide means for setting the stop means when the shifting lever is moved into reverse position.

A still further object of the invention is to provide means for rendering the left or right signals inactive by the operation of the pedals or the shifting lever.

Another object of the invention is to provide means for holding the stop signal on after the vehicle has been stopped and the clutch pedal released.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 32 is a section on line 32—32 of Figure 31.

Figure 37 is a view of the front signal casing.

Figure 1:
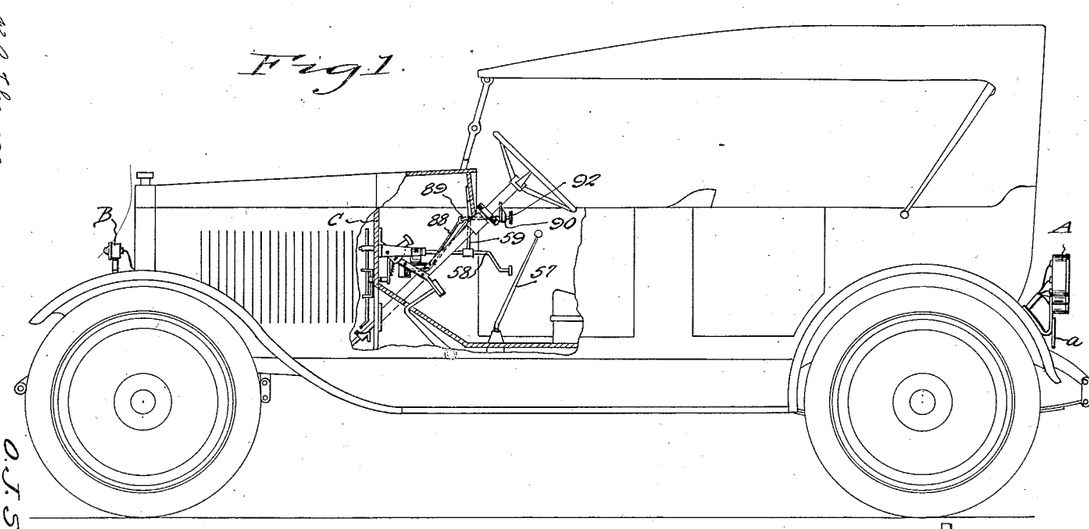
Figure 1 is a view with parts broken away showing the invention applied to an automobile.
Figures 2, 24, 25, 28, 33:
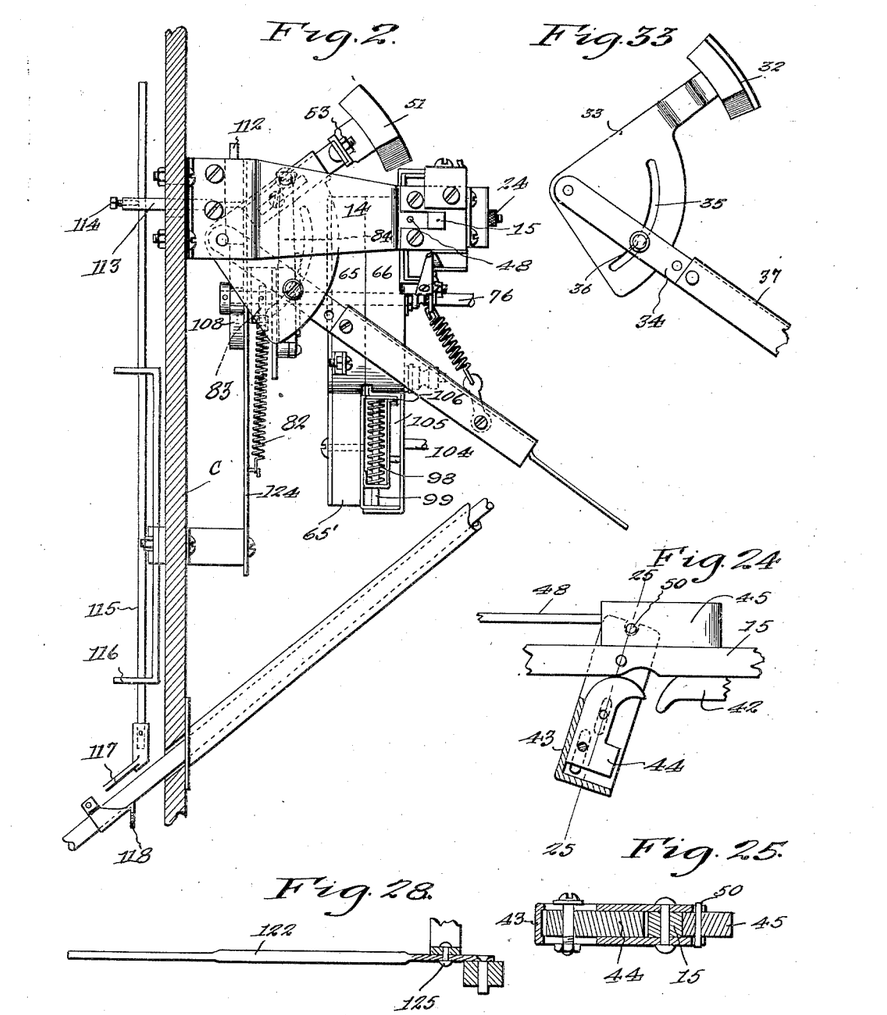
Figure 2 is a sectional view through portion of an automobile showing the device in end view.
Figure 24 is a view with parts in section showing a portion of the sliding bar, the member which is operated by the wedge of the clutch pedal and a portion of the fulcrum forming member connected with the parts actuated by the wedge of the brake pedal.
Figure 25 is a section on line 25—25 of Figure 24.
Figure 28 is a section on line 28—28 of Figure 19.
Figure 33 is a view of the wedge carrying member and its connecting arm of the brake pedal operated device.
Figures 3, 36, 38:
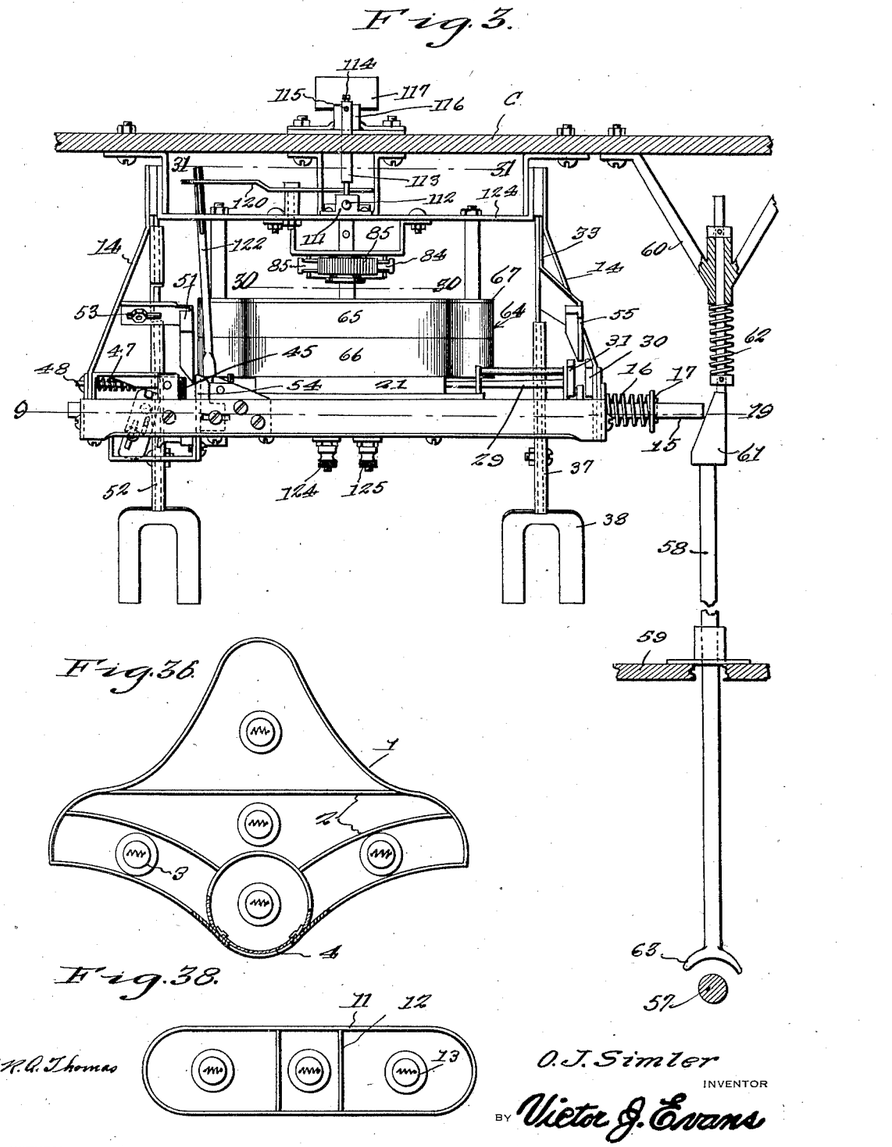
Figure 3 is a top plan view with the dash and shifting lever in section.
Figure 36 is a similar view but with the cover removed.
Figure 38 is a similar view but with the cover removed.
Figures 4, 23, 29:
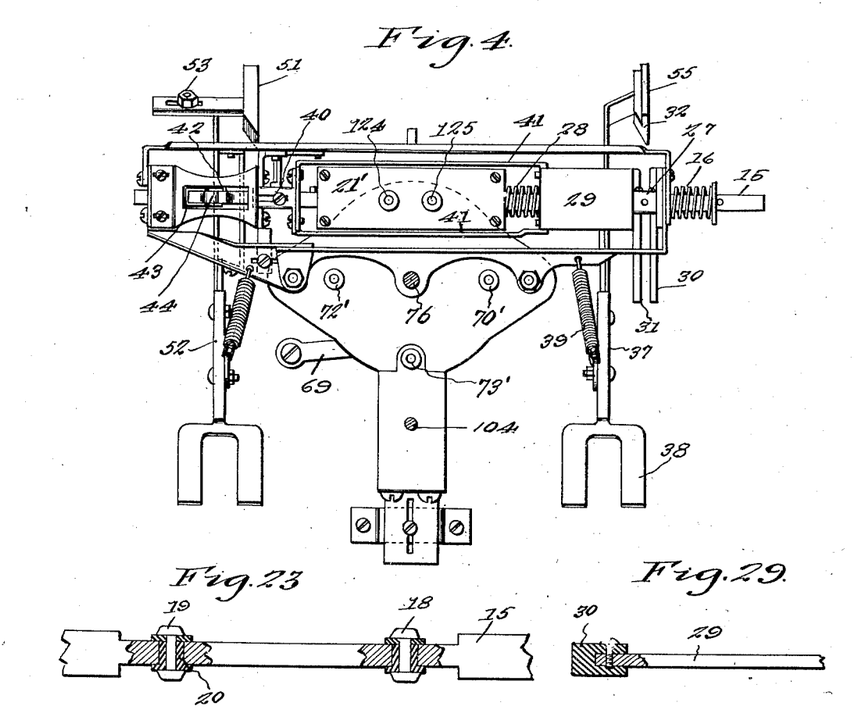
Figure 4 is a front view of the device.
Figure 23 is a detail view of the sliding bar, with parts broken away to show the arrangement of the contacts.
Figure 29 is a detail view with parts in section of the switch operating bar of the brake pedal operated means.
Figure 5:
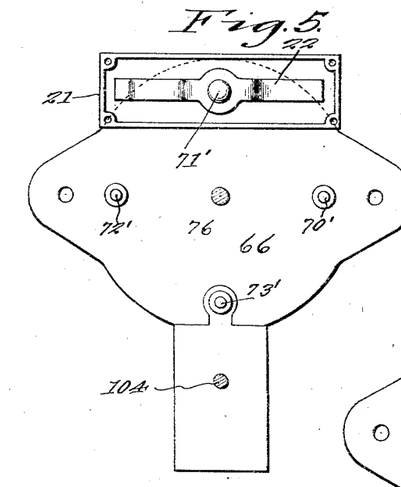
Figure 5 is a front view of the two switch casings, with the top of the small casing removed.
Figure 6:
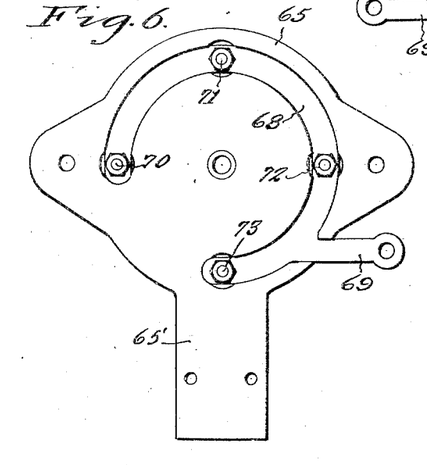
Figure 6 is a rear view of the large switch casing, with the cover plate removed.
Figure 7:
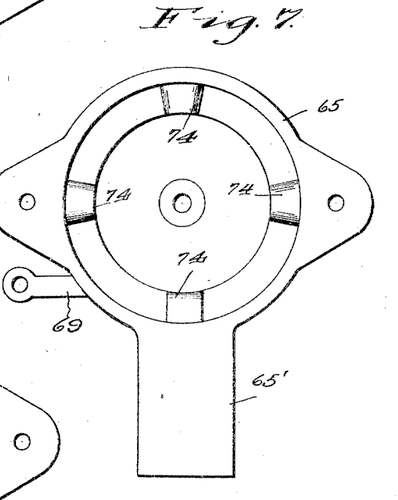
Figure 7 is a view of the inner face of the rear section of the large switch casing.
Figure 8:
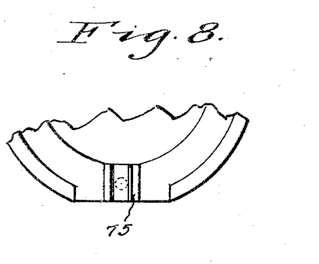
Figure 8 is a detail view of the inner face of the lower part of the front section of the large switch casing.
Figures 9, 10, 11, 12, 13, 14, 15:
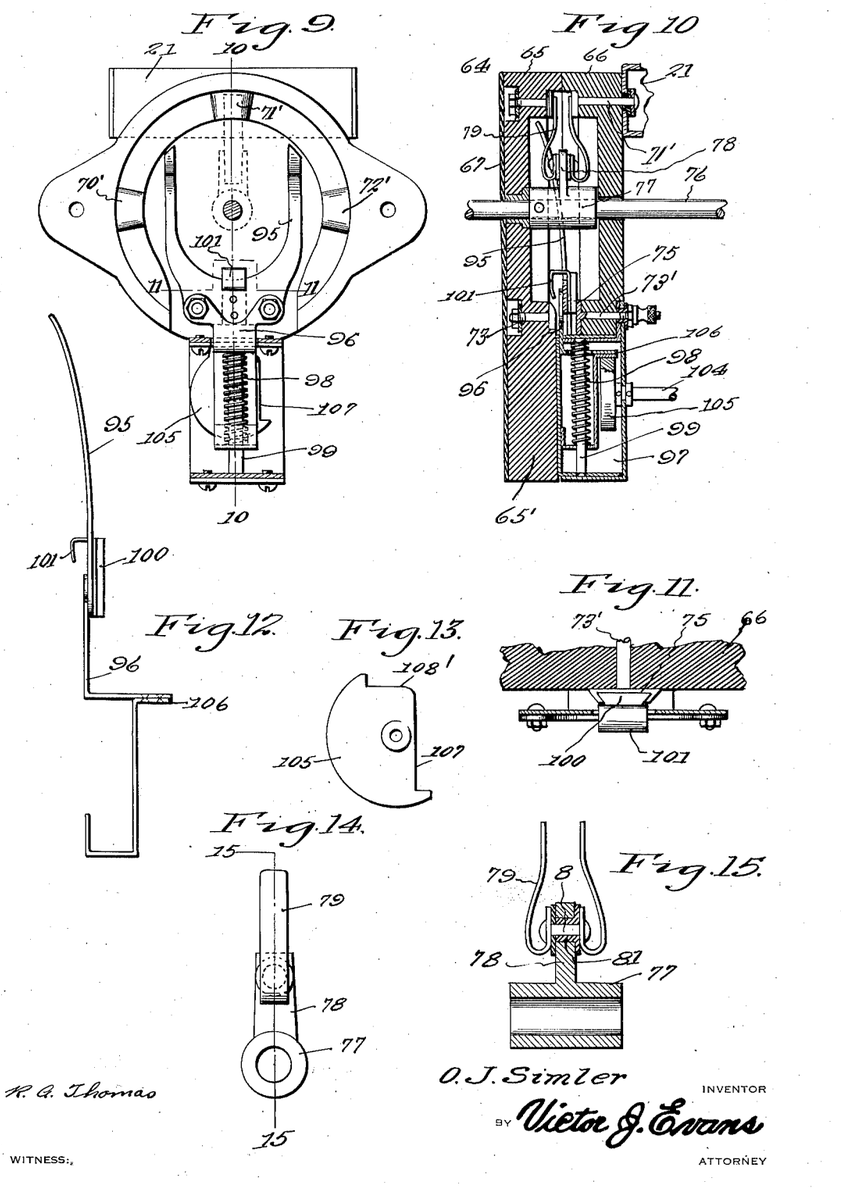
Figure 9 is a view of the rear or inner face of the front section of the large switch casing with the parts carried thereby.
Figure 10 is a section on line 10—10 of Figure 9.
Figure 11 is a section on line 11—11 of Figure 9.
Figure 12 is a view of the spring pressed cam actuated member within the casing.
Figure 13 is a view of the cam for actuating said member.
Figure 14 is a view of the double spring wiper and its carrying sleeve.
Figure 15 is a section on line 15—15 of Figure 14.
Figure 16:
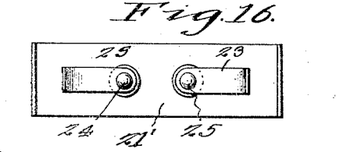
Figure 16 is a view of the inner face of the cover for the small switch casing.
Figure 17:
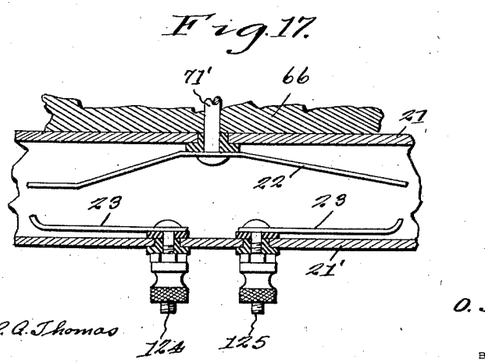
Figure 17 is a sectional detail view through the small switch casing.
Figure 18:
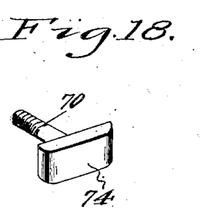
Figure 18 is a view of one of the contacts carried by the large switch casing.
Figure 19:
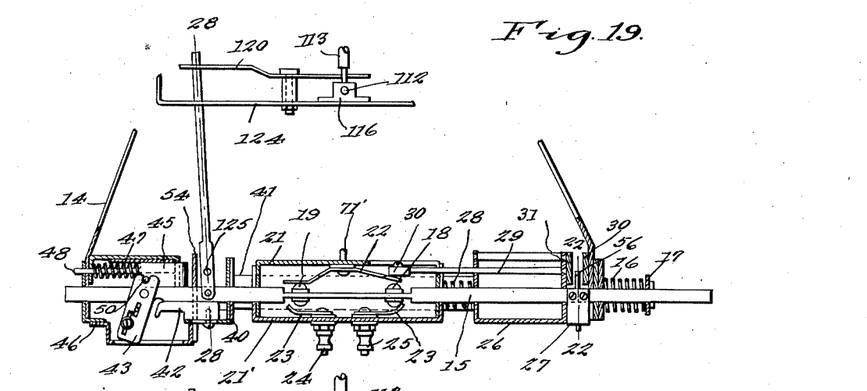
Figure 19 is a section on line 19—19 of Figure 3.
Figure 20:
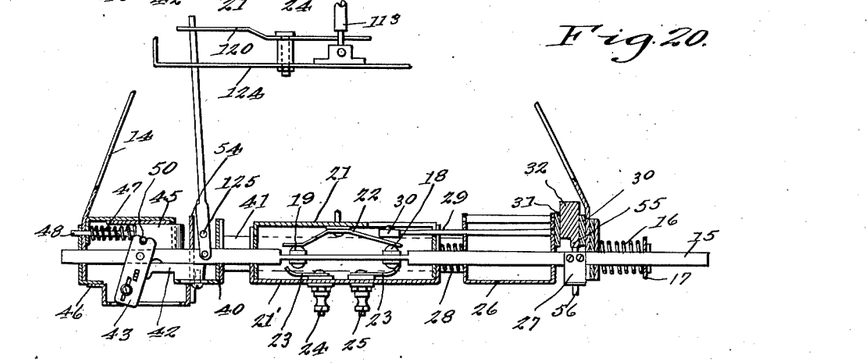
Figure 20 is a similar view but showing the parts in the position to which they have been moved by the operation of the brake pedal.
Figure 21:
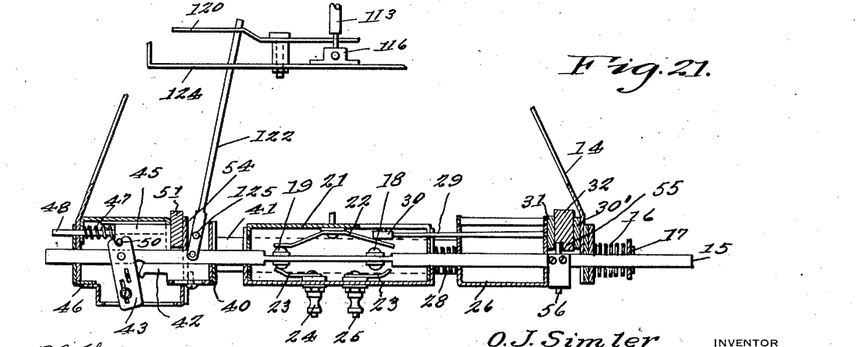
Figure 21 is a view similar to Figure 19 but showing the parts in a position to which they have been moved by the operation of both pedals.

As shown in Figure 1, I prefer to place a signal A at the rear of the vehicle and a signal B at the front thereof, this figure showing the signals as attached to the fenders but it will, of course, be understood that they may be attached wherever desired. The signal A comprises a casing 1 having partitions 2 therein for dividing the casing into a plurality of chambers each of which is provided with a lamp 3. The lower central chamber has a window 4 in its bottom so that some of the rays of light can pass therethrough and illuminate the license plate $a$ which is supported below the casing. The front of the casing carries a lens 5 which covers the central lower chamber so that this part of the device acts as a tail light. Said front is also provided with a pair of arrows 6 and 7 formed of transparent material which cover the two lower chambers, the arrow 6 acting as a "right" signal and the arrow 7 acting as a "left" signal. The cover also carries the "slow" signal 8 which covers the central chamber and it also has the representation of a hand 9 therein and the word "Stop," as shown at 10, the part of the cover carrying these devices covering the top chamber so that this chamber forms the stop signal which includes the word "Stop" and the hand. Thus this signal device will act to indicate when the vehicle is to be turned to the right or to the left, is to have its speed checked or is to come to a full stop. The device also acts as a tail light and as means for illuminating the license plate.

The signal B comprises an elongated casing 11 divided by the partitions 12 into three chambers, the cover of the device carrying the arrows 6' and 7' and the conical shaped lens 5', the lens covering the center chamber with the arrows forming portions of the front of the end chambers. Each chamber has a lamp 13 therein and the wiring of the lamps of the two casings is so arranged that when the current is turned on to the lamp of the tail light chamber 5, it will also be turned on to the lamp in the central chamber of the casing B and when the right signal is illuminated in casing A, the right signal 6' will also be illuminated in casing B. The left signals 7 and 7' will also be illuminated simultaneously. By making the lens 5' in the front casing of the shape shown, it can be seen from the side of the vehicle, as will be apparent from Figure 1.

A frame 14 is fastened to the dash C of the vehicle and this frame is formed with guideways for a horizontally movable bar 15 which is normally held in a neutral position by a coiled spring 16 which is located between a part of the frame and a projection 17 on the bar. The central part of this bar carries the contacts 18 and 19 which project from each side of the bar and are insulated from the bar by the insulation 20. The bar passes through a switch casing 21 which carries a double spring contact 22 for engaging the rear parts of the contacts 18 and 19 and its cover 21' carries a pair of spring contacts 23, one of which is connected with the stop terminal 24 and the other with the slow terminal 25, these terminals receiving the wires which lead to the lamps in the "stop" and "slow" chambers of the signal A.

The contacts 18 and 19 operate between the double contact 22 and the single contacts 23 so as to bridge these contacts, the contact 22 being connected with the source of supply, as will be hereinafter described.

A frame 26 is slidably mounted on the bar 15 and is normally held against a small casing 27 on said bar by means of a coiled spring 28 which is located on the bar between the frame 22 and the casing 21. This frame carries an arm 29 which carries a block 30 of insulating material at its end, this end of the bar being arranged in the casing 21 so that when the frame is moved on the bar against the action of the spring 28, the block will strike a part of the contact 22 and press it into engagement with the contact 18, this contact 22 being out of engagement with the contact 18 when the bar 15 is in its normal position. A wear plate 30' is carried by a part of the frame and a similar plate 31 is carried by the outer end of the frame 26, these plates being adapted to be engaged by a wedge member 32 which is carried by a segmental plate 33 pivoted to an arm 34 and adjustable on the arm by means of the slot 35 and the bolt 36. This arm 34 is pivoted to the frame and is adjustable as to its length, as shown at 37 and its lower end is provided with a fork 38 which is adapted to engage the brake pedal of the vehicle. A spring 39 tends to hold the arm in raised position with its forked end engaging the foot part of the pedal. Thus when the brake pedal is depressed, the arm will be rocked on its pivot so that the wedge 32 will pass between the plates 30 and 31 and thus force the frame 26 to the left so as to cause the block 30 on the arm 29 to press the spring contact 22 against the contact 18 and thus complete the circuit to the slow signal of the device A. In other words, when the foot brake is applied the slow signal will be given. As soon as the foot is removed from the pedal, the springs 16, 28 and 39 will return the parts to normal position and thus break the circuit to the signal.

A bracket 40 is slidably mounted on the bar 15 adjacent the left hand end of the casing 21 and this bracket is connected with the frame 26 by the straps 41 arranged above and below the casing 21 so that when the frame 26 is moved by the wedge member 32 the bracket will also be moved. This bracket carries a fulcrum block 42 which is adjustably connected with the bracket as shown and a small casing 43 is pivoted to the left hand end of the rod 15 and adjustably supports a fulcrum block 44, each block being formed with a pointed end for contacting with each other when the blocks come together. A slide 45 is arranged in a part of a casing 46 which constitutes part of the frame 14 and the beveled outer end of said slide is normally held projecting through an opening in the inner end of the casing by a spring 47 which is arranged on the stem 48 of the slide. The casing 46 encloses the left hand end of the bar 15 and the casing 43 is located in said casing 46. The slide 45 carries a pin 49 which engages a notch 50 formed in the inner end of the casing 43 and the beveled end of the slide is adapted to be engaged by a wedge member 51 carried by an arm 52 pivoted in the frame when the forked part of said arm is engaged by the clutch pedal of the vehicle. This arm and its attached parts are similar to the brake pedal operated arm except that the wedge member 51 can be adjusted horizontally by being attached to the segmental plate by the slot and bolt connection shown generally at 53. A wear plate 54 is attached to the casing 46 and forms a space with the outer end of the slide 45 to receive the wedge member 51.

When the clutch pedal is depressed, the arm 52 will be rocked on its pivot so as to cause the wedge 51 to pass between the slide and the plate 54 so that the slide will be moved inwardly against the action of its spring and this action will rock the casing 43 through the pin 49 and notch 50. No other parts will be moved, however, and the signals will remain inactive. However, when the clutch pedal is depressed after the brake pedal has been depressed, the rocking movement of the casing 43, due to the movement of the slide 45 by the wedge 51 will cause the pivotal point of the casing and therefore the bar 15 to move to the left, due to the fact that the fulcrum block 42 has been moved against the block 44 in said casing 43 by the movement of the frame 26 and the bracket 40 under the action of the wedge 32 which has been actuated by the depression of the brake pedal. This movement of the bar 15 will cause the contact 19 to bridge the contacts 22 and 23, thus completing the circuit to the stop lamp and at the same time the contact 18 will move away from the contacts 22 and 23, thus breaking the circuit to the slow lamp.

When the wedge 32 is lowered, a rib 55 thereon will engage a spring plunger 56 in the casing 22 which is carried by the bar 15 and force the said plunger inwardly but as soon as the bar 15 is moved by the wedge 51 the casing 27 will be moved with the bar 15 and thus the plunger will spring forwardly and engage the wedge to one side of the rib so that when the wedge 51 is raised by the removal of the foot from the clutch pedal, the bar 15 cannot return to its normal position so that current will continue to flow to the stop light until the brake pedal is released.

From the foregoing it will be seen that the clutch pedal can be manipulated without operating the signals, but when the brake pedal is depressed, current will flow to the slow signal to indicate that the speed of the vehicle is being checked and the current will be broken as soon as the foot is removed from the brake pedal. However, if both pedals are depressed, the current will be broken to the slow signal and supplied to the stop signal, thus indicating that the vehicle is going to stop.

I may also provide means whereby the bar 15 will be actuated to complete the circuit to the stop signal when the shifting lever 57 is moved to reverse position. Such means includes a rod 58 supported by the bracket 59 depending from the instrument board of the vehicle and by a bracket 60 on the dash, the bar having a cam 61 thereon which will engage the end of the bar 15 when the rod 58 is moved inwardly against the action of the spring 62 to move said bar 15 to cause the contact 19 to bridge the contacts 22 and 23 and thus complete the circuit to the stop signal. The rod 58 has a curved head 63 thereon which will be engaged by the shifting lever 57 when the same is moved into reverse position. A switch casing 64 is supported in rear of the casing 21 by the frame and this casing 64 is composed of the two sections 65 and 66 formed of non-conducting material and the plate 67 which covers the rear part of the section 65.

The plate 65 carries a metal ring 68 in a groove on its rear face, the ends of which are spaced apart and an arm 69 is formed with the ring and carries a terminal to which a conductor from a battery or other suitable source of supply is connected. Four terminals 70, 71, 72 and 73 pass through the section 65 and have their rear ends electrically connected with the member 68. The inner end of each terminal is provided with a head 74, the head of the bottom terminal having its upper edge beveled while the heads of the other terminals have each end beveled. Similar terminals 70', 71' and 72' are carried by the front section 66 and are arranged opposite the terminals 70, 71 and 72. This front section also carries a bottom terminal 73' which has its inner end provided with a dovetail head 75. The terminal 71' passes into the casing 21 where it is connected with the double spring contact 22. A shaft 76 passes through the casing 64 and has a sleeve 77 thereon arranged within the casing. The sleeve is provided with an arm 78 which carries a spring wiper 79 on each side thereof, the wipers being fastened to the arm by a rivet 80 which passes through non-conducting material 81 so that the wipers are electrically connected together but are insulated from the sleeve. These wipers will engage the heads of the contacts carried by the two sections 65 and 66 of the casing as the shaft 76 is rotated so that the space between the heads will be bridged and thus current will flow from the ring 68, which is connected with the source of supply, through a terminal in the section 65, through the wipers to a terminal in the section 66.

A spring 82 has its lower end fastened to a part of the frame and its upper end is fastened to a pin 83 in the rear end of the shaft 76 and this spring tends to hold the shaft 76 in a position with the wipers 79 engaging the heads of the upper contacts 71 and 71' so that current will pass from the source through the member 68 to the spring terminal 22 and thus flow to the slow and stop signals when the pedals are operated, as before explained. To insure the return to this position of the shaft 76, I provide a pair of arms 84 which have their upper ends connected together by a coiled spring 85 and their curved lower ends are hingedly connected together as shown at 86, the pin of the hinge being supported on a part of the frame and a cam 87 on the shaft 76 is engaged by the curved portions of the arms so that the action of the spring 85 on the arm 84 will act on the cam 87 to cause the shaft 76 to assume a position with the wipers 79 in engagement with the heads of the upper terminals. When the shaft is turned to place the wipers in engagement with the heads of the terminals 70 and 70', current will flow from the member 68 through said terminals and the wipers and through a conductor which is connected with the terminal 70' to the lamp of the left signal in both devices A and B and when the wipers are in engagement with the heads of the terminals 72 and 72', current will flow to the left hand signal lamps in both devices through a conductor which is connected with the terminal 72'. Thus by turning the shaft 76, the operator can flash either the "right" or "left" signal to indicate that he is to make a right or left hand turn and these signals can be seen at both the front and rear of the vehicle.

Figures 22, 30, 34:
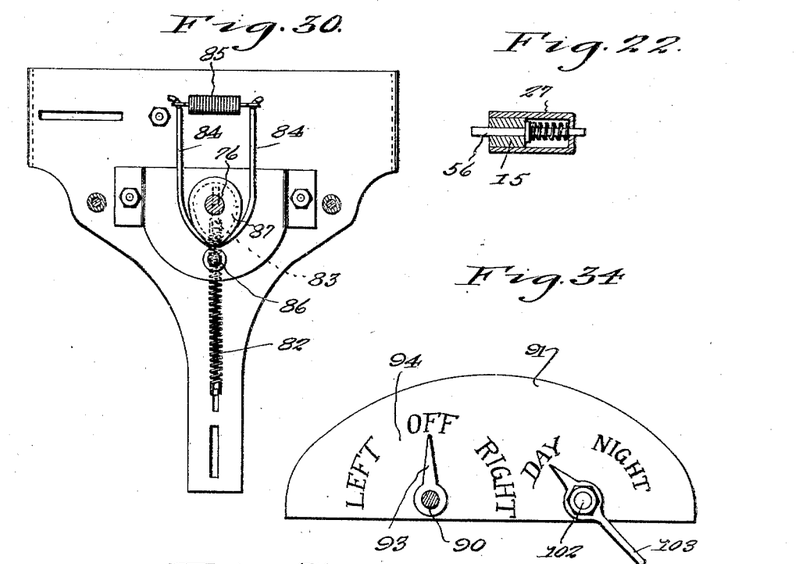
Figure 22 is a section on line 22—22 of Figure 19.
Figure 30 is a section on line 30—30 of Figure 3.
Figure 34 is a view of the dial and fingers of the light controlling device and the directional signal device.
Figures 26, 27, 31:
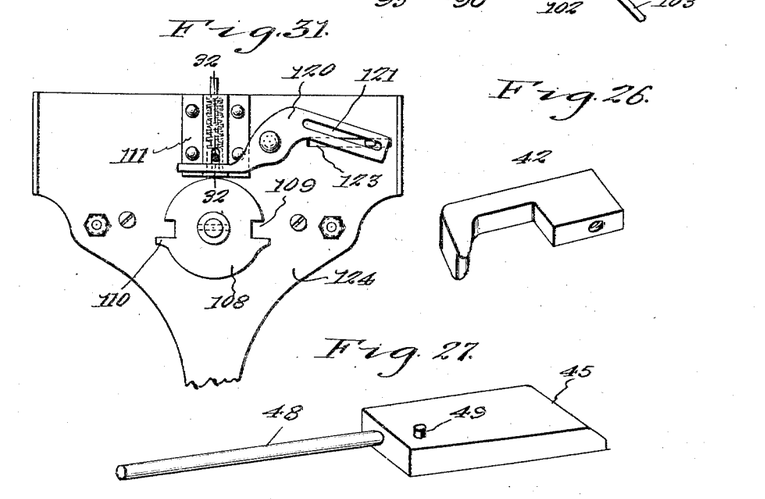
Figure 26 is a view of the fulcrum forming member.
Figure 27 is a view of the member operated by the wedge of the clutch pedal.
Figure 31 is a section on line 31—31 of Figure 3.
Figures 31, 35:
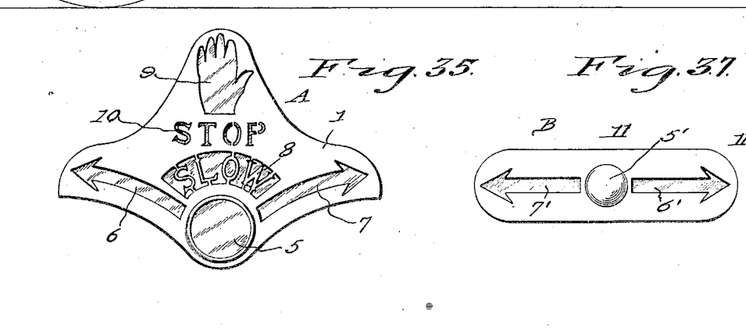
Figure 35 is a view of the rear signal casing.
Figure 34:
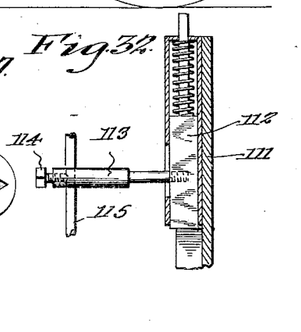

The outer end of the shaft 76 is connected by the shaft 88 and the universal joints 89 with a shaft 90 which passes through a dial 91 supported by the steering column, the outer end of the shaft having a handle 92 thereon and a finger 93 which cooperates with the indicia 94 on the dial, Figure 34 showing this indicia consisting of the words "Left," "Off" and "Right." Thus by turning the shaft 90 by its handle to place the finger 93 where it will point to either "right," "left" or "off," the shaft 76 can be moved to switch on either the right signal or the left signal. In the off position, the shaft 76 will be in a position with its wipers engaging the upper contacts so that the spring terminal 22 will be electrically connected with the battery.

A spring fork member 95 is arranged in the casing 64 in such a manner that its prongs will be engaged by the wipers when the same are being moved from their upper position to the right or left. This member 95 is fastened to a frame 96 which extends downwardly into a casing 97 located in front of an extension 65' of the rear section 65 of the casing 64 and attached to the bottom part of the section 66. The frame 96 is slidably supported and is normally held in its lowest position by a coiled spring 98 arranged on a guide rod 99 for the frame and located in the casing 97. The member 95 carries a part 100 which is of dovetail shape and engages the dovetail head 75 of the terminal 73' and this part 100 has a hook 101 which, when the frame 96 is in its lowest position, will engage the head of the terminal 73 so that current can pass from this terminal 73 through the part 100 to terminal 73', said terminal 73' being connected with the tail lamp and the lamp in the middle chamber of the device B so that when the frame 96 is pressed downwardly by the spring 98, the tail lamp and the central lamp of the device B will be lighted. When the frame 96 has been raised, however, the circuits to these lamps will be broken. The frame can be raised to break the circuits through means of a shaft 102 passing through the dial 91 and having a combined pointer and handle 103 thereon for cooperating with the legends "Day" and "Night" on the dial, the shaft 102 being connected by a shaft and universal joints with a shaft 104 which extends into the casing 97 and has a cam 105 thereon which engages a projection 106 on the frame 96. When the low part 107 of the cam is engaging with the projection 106, the spring 98 will hold the frame in its lowest position but when the high part 108' engages the projection 106, the frame will be in raised position. Thus the tail lamp and its companion lamp in device B can be lighted or extinguished from the dash.

By means of the spring fork member 95, the circuit will be completed to the tail light and its companion light when the shaft 76 and its wipers are moved to make a right or left hand signal. This will facilitate reading of the right and left hand signals as they will be placed either to the right or left of the central light. The circuits will be completed to the central lamps even though the member 100 and the frame 96 are in raised position, for the current will pass from the wiper 79 through the member 95 to the part 100 which is always in contact with the terminal 73'. By this means, the tail lamp and its companion lamp will be lighted during the day when the shaft 102 has been turned to the "day" position. When this shaft is in the "night" position, the terminals 73 and 73' will be bridged so that current will flow directly to the tail lamp.

A disk 108 is fastened to the rear end of the shaft 76 and said disk is provided with a pair of oppositely arranged notches 109. The disk is also provided with a pair of oppositely arranged lips 110 which form extensions of the lower walls of the notches. These lips will strike a guideway 111 and thus prevent the disk from further movement so that the shaft 76 can only be moved a quarter turn in either direction from its normal position. The guideway 111 receives a spring latch 112 which is adapted to engage either one of the notches 109 to hold the parts with the wipers in engagement with either the terminals for the left hand signal or the terminals for the right hand signal. This arrangement prevents the springs 82 and 85 from returning the shaft 76 and its attached parts to a position where the wipers will engage the upper terminals 71 and 71'.

A rod 113 is carried by the latch 112 and said rod passes through a slot in the dash where it is attached by a set screw 114 with a vertically arranged rod 115 slidably supported on the front face of the dash by means of a bracket 116 and said rod has a member 117 on its lower end which will be engaged by a cam 118 on the steering post when said post is turned to bring the front wheels back into a straight position after they have been turned to cause the vehicle to move to make a turn. Thus after the right or left signal has been set by hand and the turn completed, the parts will be automatically returned to a normal position and the signal lights extinguished by the cam 118 engaging the member 117 on the rod 115 so that said rod will be raised which will cause the rod 113 to raise the latch 112 out of a notch in the disk 108 so that the springs 82 and 85 will return the shaft 76 to its normal position.

I also provide means whereby the manipulation of the bar 15 will raise the latch 112 out of the notch in the disk 108, such means consisting of a lever 120 pivoted to a part of the frame and having one end passing under the bar 113. The other end of the lever is provided with a slot 121 which receives the end of a lever 122 which passes through a slot 123 in a part 124 of the frame 14 and is pivoted adjacent its other end to a part of the frame, as shown at 125. The said other end of the lever is pivoted to the bar 15 so that when said bar is moved to the left, the lever 122 will be rocked on its pivot and this movement will be communicated to the lever 120 through engagement of the end of the lever 122 with the slot 121 in said lever 120 so that said lever 120 will raise the bar 113 and thus draw the latch 112 out of the notch 109 in the disk 108 so as to permit the parts to return to normal position and thus extinguish the right or left signal. By this arrangement, when an operator sets one of the directional signals in order to make a turn but the turn is not made, so that the signal cannot be extinguished by the steering mechanism, the signal can be extinguished by depressing both of the pedal levers to move the bar 15 which will operate the lever 122, as before described.

As will be seen, unless the shaft 76 is held against movement by its springs through means of the disk 108 and the latch 112, its springs will hold it in a position with the finger 93 in the "off" position and with the brushes 79 engaging the upper contacts so that current will flow to the spring member 22 in casing 21, thus supplying current to the "slow" and "stop" signals upon the operation of the brake and clutch pedals. When the driver wishes to make a turn, he turns the shaft 90 to either left or right according to the direction of the turn, and this will turn the shaft 76 a quarter turn and said shaft will be held in this position by the latch 112 engaging one of the notches 109 in the disk 108. The brushes 79 will then complete the circuit to either the left or right hand signal means and as said brushes are in contact with the member 95, current will also flow to the tail lamp and its companion lamp in the front signal device. Of course, when driving at night, the tail lamp and its companion lamp will be lighted continuously by the adjustment of the shaft 102 for night driving, which will cause the hook 101 of member 100 to engage the terminal 73. Then when the turn has been completed, the straightening out of the front wheels will cause cam 108' to engage the member 117 and raise the rod 115 which will release the latch 112 so that the spring can return the shaft 76 to its normal position with its brushes bridging the upper contacts so that the circuit of the directional signals will be broken. If the turn was not made after setting the turning signal, the driver, by depressing the clutch and brake pedals, could release the locking means so as to break the circuit to the directional signals and complete the circuit to the member 22.

As before stated, the operation of the brake pedal will actuate the "slow" signal and then when the clutch pedal is operated, the circuit of the "slow" signal will be broken and the circuit of the "stop" signal will be completed and this circuit will remain on as long as the brake pedal is held depressed. The clutch pedal can be manipulated alone without affecting the signals.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A signal device for a vehicle comprising a casing having slow and stop signal lamps therein, circuits for the lamps, means operated by the brake pedal for completing the circuit to the slow signal lamp, means operated by the depression of the clutch pedal, while the brake pedal is held depressed, for completing the circuit to the stop signal lamp while breaking the circuit to the slow signal lamp and means for causing the brake pedal to hold the parts with the stop signal on after the clutch pedal has been released.

2. A signal device for a vehicle comprising a casing having slow and stop signal lamps therein, circuits for the lamps, means operated by the brake pedal for completing the circuit to the slow signal lamp, means operated by the depression of the clutch pedal, while the brake pedal is held depressed, for completing the circuit to the stop signal lamp while breaking the circuit to the slow signal lamp, means for causing the brake pedal to hold the parts with the stop signal on after the clutch pedal has been released, and means operated by the movement of the shifting lever to reverse position for actuating part of the before mentioned brake pedal operated means whereby the circuit to the stop signal will be closed when the lever is moved to reverse position.

3. A switch device comprising a double spring contact, means for connecting the same to a source of supply, a pair of single contacts, means for connecting each single contact to a circuit, a slidable bar having contacts thereon for engaging the spring contacts, a spring for holding the bar in neutral position, a slidable frame, means carried thereby for engaging a portion of the double contact to force it against a contact on the bar to complete one of the circuits, spring means for holding the frame in neutral position, a wedge member for moving the frame, means for operating the wedge member, a fulcrum block carried by the frame, a rocking member pivoted to the bar and engaging the block when the frame has been moved by its wedge member, a spring pressed slide engaging with the rocking member, a second wedge for moving the slide to cause the rocking member to move the bar when it is engaged by the fulcrum block, means for moving the second wedge, this movement of the bar causing the contacts to complete the other circuit and to break the first circuit.

4. A switch device comprising a double spring contact, means for connecting the same to a source of supply, a pair of single contacts, each connected to a circuit, a slidable bar having contacts thereon for engaging the spring contacts, a spring for holding the bar in neutral position, a slidable frame, means carried thereby for engaging a portion of the double contact to force it against a contact on the bar to complete one of the circuits, spring means for holding the frame in neutral position, a wedge member for moving the frame, means for operating the wedge member, a fulcrum block carried by the frame, a rocking member pivoted to the bar and engaging the block when the frame has been moved by its wedge member, a spring pressed slide engaging the opposite end of the rocking member, a second wedge for moving the slide to cause the rocking member to move the bar when it is engaged by the fulcrum block, means for moving the second wedge, this movement of the bar causing the contacts to complete the second circuit and break the first circuit, a plunger carried by the bar and a rib on the first wedge with which the plunger will engage for preventing the return movement of the bar when the first wedge is engaging its frame and the other wedge has been released.

5. A switch device comprising a supporting frame, a bar slidably mounted therein and having a pair of contacts thereon, a double contact normally engaging one of said contacts, a sliding member in the frame, means carried thereby for pressing a part of the double contact against the second contact on the bar when the sliding member has been actuated from its normal position, springs for holding said sliding member and the bar in normal positions, a pair of single contacts, one of which is normally in engagement with one of the contacts on the bar, means for moving the sliding member, means for actuating the bar to move one of its contacts out of engagement with said single contact and its other contact into engagement with the second single contact, a circuit connected with the double contact, a switch in the circuit, means for locking the switch in open position, means for normally holding the switch in closed position and means connected with the bar for releasing the locking means when the bar is moved from its normal position.

6. A switch comprising a supporting frame, a slidable member therein, means carried by said member for closing a first circuit, means for operating the slidable member to close said circuit, a fulcrum block connected with the slidable member, a spring pressed bar slidably arranged in the frame, a rocking member pivoted to the bar and engaging the block when the slidable member has been moved by its operating means, a spring pressed slide engaging the rocking member, means for moving the slide to cause the rocking member to move the bar when said rocking member is engaged by the block and means on the bar for closing a second circuit and breaking the first circuit.

7. A switch comprising a supporting frame, a slidable member therein, means carried by said member for closing a first circuit, a wedge for operating the slidable member, a fulcrum block connected with the slidable member, a spring pressed bar slidably arranged in the frame, a rocking member pivoted to the bar and engaging the block when the slidable member has been moved by its wedge, a spring pressed slide engaging the rocking member, a second wedge for moving the slide to cause the rocking member to move the bar when said rocking member is engaged by the block, means for operating said wedges, means on the bar for closing a second circuit and breaking the first circuit and means for moving the bar independently of the wedges.

8. A switch comprising a supporting frame, a slidable member therein, means carried by said member for closing a first circuit, a wedge for operating the slidable member, a fulcrum block connected with the slidable member, a spring pressed bar slidably arranged in the frame, a rocking member pivoted to the bar and engaging the block when the slidable member has been moved by its wedge, a spring pressed slide engaging the rocking member, a second wedge for moving the slide to cause the rocking member to move the bar when said rocking member is engaged by the block, means for operating said wedges, means on the bar for closing a second circuit and breaking the first circuit and means on the bar engaging the first mentioned wedge for preventing the bar from returning to normal position after the withdrawal of the second wedge so as to hold the second circuit closed as long as the first wedge is in active position.

In testimony whereof I affix my signature.
OSCAR J. SIMLER.